United States Patent [19]
Zilka et al.

[11] Patent Number: 5,526,497
[45] Date of Patent: Jun. 11, 1996

[54] SYSTEM HAVING SWITCH THAT PROVIDES CAPACITIVE LOAD ISOLATION

[75] Inventors: Anthony M. Zilka; Massoud Taraghi, both of Portland; Paul E. Prince, Tigard, all of Oreg.

[73] Assignee: Intel Corporation, Santa Clara, Calif.

[21] Appl. No.: 388,583

[22] Filed: Feb. 9, 1995

Related U.S. Application Data

[63] Continuation of Ser. No. 896,048, Jun. 9, 1992, Pat. No. 5,418,911.

[51] Int. Cl.⁶ .............................. G06F 13/00; H03H 7/48
[52] U.S. Cl. .................. 395/310; 395/311; 326/56; 364/240; 364/240.5; 364/239; 364/238; 364/DIG. 1
[58] Field of Search .................... 395/325, 250, 395/425, 775, 200, 275, 310, 311, 800, 287; 307/473, 38, 147; 370/60.1; 326/56

[56] References Cited

U.S. PATENT DOCUMENTS

| | | | |
|---|---|---|---|
| 3,697,702 | 10/1972 | Buonsante et al. | 379/79 |
| 3,761,633 | 9/1973 | Schlichte | 370/51 |
| 4,410,961 | 10/1983 | Dlugos et al. | 395/275 |
| 4,442,502 | 4/1984 | Friend et al. | 395/311 |
| 4,852,083 | 7/1989 | Niehaus et al. | 370/58 |
| 4,860,244 | 8/1989 | Bruckert et al. | 364/900 |
| 4,903,259 | 2/1990 | Hayano | 370/58.3 |
| 4,935,922 | 6/1990 | Wicklund et al. | 370/60 |
| 5,046,041 | 9/1991 | Lecocq et al. | 364/900 |
| 5,109,333 | 4/1992 | Kubota et al. | 395/275 |
| 5,191,656 | 3/1993 | Forde, III et al. | 395/325 |
| 5,220,566 | 6/1993 | Ikenoue | 370/112 |
| 5,274,773 | 12/1993 | Squires et al. | 395/275 |
| 5,334,881 | 8/1994 | Kirkpatrick | 327/407 |

*Primary Examiner*—Gopal C. Ray
*Attorney, Agent, or Firm*—Blakely, Sokoloff, Taylor & Zafman

[57] ABSTRACT

Components of a computer system are coupled using a data path application specific integrated circuit (ASIC) crossbar switch. A plurality of multi-bit bi-directional register ports are intercoupled using multi-bit multiplexer circuitry. Port selection control signals provided to the multiplexer direct the flow of data through the data path ASIC. The data path ASIC electrically isolates the components of the computer system, thereby minimizing the capacitive load on signal lines and permitting signals to transfer at high rates of speed. Control of the data path ASIC is provided by external circuitry to increase the flexibility of the crossbar switch by removing dependency on any particular communications protocol. Multiple data path ASICs may be combined in parallel to increase bandwidth of data flow by using a bit slice scheme.

9 Claims, 4 Drawing Sheets

SYSTEM HAVING SWITCH THAT PROVIDES CAPACITIVE LOAD ISOLATION

This is a continuation of application Ser. No. 07/896,048, filed Jun. 9, 1992, U.S. Pat. No. 5,418,911.

BACKGROUND OF THE INVENTION (1) Field of the Invention

The present invention relates to a computer system. More specifically, the present invention relates to method and apparatus for the exchange of data at a high rate of speed among components within a computer system.

(2) Art Background

Data buses are used commonly throughout the computer industry. A bus is a set of hardware lines or wires used for data transfer among the components of a computer system. A bus is essentially a shared highway that connects different parts of the system, for example the microprocessor, disk drive controller, memory and input/output (I/O) ports, and enables them to transfer information. Usually supervised by the microprocessor, the bus is commonly specialized for carrying different types of information. One group of wires (actually, traces on a printed circuit board), for example, carries data; another carries the addresses (locations) where specific information can be found; yet another carries control signals to ensure that the different parts of the system use their shared highway without conflict. A communication protocol, or set of rules or standards, for the bus enables the components of the computer to connect with one another and to exchange information with as little error as possible.

Buses are characterized by the number of bits they can transfer at a single time. A computer with an 8-bit data bus, for example, transfers 8 bits of data at a time, and one with a 16-bit data bus transfers 16 bits at a time.

Because the bus is integral to internal data transfer and yet computer users often need to add extra components to the system, most microcomputer buses allow for expansion through one or more expansion slots (connectors for add-on circuit boards). Such boards, when they are added, make an electrical connection to the bus and effectively become part of the system.

FIG. 1 illustrates a computer system which has components coupled with a bus. In the Figure, bus 20 couples processor 10 to devices 12, 14, 16 and 18. Devices 12, 14, 16 and 18 are representative of generic computer components which exchange data among themselves or with the processor. Examples of devices 12, 14, 16 and 18 include: input/output (I/O) devices, status and control registers, random access memory (RAM) and programmable read only memory (PROM).

Processor 10 and each of the devices 12, 14, 16 and 18 are connected in parallel to bus 20. Each of the devices 12, 14, 16 and 18 and processor 10 present a capacitive and inductive load to bus 20. Modern processors may run at speeds of approximately 50 megahertz. However, connecting several loads to data bus 20 in parallel creates too much capacitive loading to permit data to be transferred across bus 20 at the operating speed of a 50 megahertz processor 10.

Referring now to FIG. 2, a computer system with two buses coupled by a bi-directional register is illustrated. In the figure, bus 24 couples processor 10 and device 18 to bi-directional register 22. Bus 26 couples devices 12, 14 and 16 to bi-directional register 22. By introducing a bi-directional register 22, and two separate buses 24 and 26, the load on each bus is decreased, thereby permitting faster communication along each bus.

In the example of FIG. 1, bus 20 was presented with five loads (processor 10 and devices 12, 14, 16 and 18. In the configuration of FIG. 2, bus 24 is presented with three loads (processor 10, device 18 and bi-directional register 22) and bus 26 is presented with four loads (devices 12, 14 and 16 and bi-directional register 22). Thus, while the total number of loads in the system has increased, the load on any given bus has decreased thereby permitting each bus to operate at a higher speed. While only one bi-directional register 22 has been introduced for ease of understanding, bus 24 and bus 26 could each be further subdivided by introducing additional bi-directional registers 22 between the devices attached to them.

While the introduction of one or more bi-directional registers 22 increases the speed at which each individual data bus can operate, there is a complexity penalty and a latency penalty which much be paid. The complexity penalty has several parts. First, each bi-directional register 22 has a significant number of parts and therefore this method introduces a significant number of additional chips into the computer system. Each chip consumes area within the computer system which could otherwise be used for other purposes or eliminated to reduce the size of the computer system. Each chip also consumes power which must be provided and produces heat which may have to be dissipated. Furthermore, routing can become an issue because each bi-directional register 22 may have to be routed to different parts all over the board. Therefore, introduction of bi-directional registers 22 increases the complexity of the design of the computer system.

Furthermore, there is latency penalty because, while the load has been reduced, signals will probably have to travel through one or more bi-directional registers 22.

SUMMARY OF THE INVENTION

It is therefore an object of the present invention to couple several computer components together in a manner whereby each component is electrically isolated from the capacitive load of the other components thereby achieving high-speed data transfer among the components.

It is a further object of the present invention to couple the components of a computer system in a manner which minimizes design complexity and signal transfer latency.

It is a further object of the present invention to create a flexible, generic intercoupling device which does not contain logic dependent upon the communication protocol of each device to be coupled.

An apparatus and method are disclosed for coupling components of a computer system using a data path application specific integrated circuit (ASIC) crossbar switch. A plurality of multi-bit bi-directional register ports are intercoupled using multi-bit multiplexer circuitry. Port selection control signals provided to the multiplexer direct the flow of data through the data path ASIC.

The data path ASIC electrically isolates the components of the computer system, thereby minimizing the capacitive load on signal lines and permitting signals to transfer at high rates of speed. Control of the data path ASIC is provided by external circuitry to increase the flexibility of the crossbar switch by removing dependency on any particular communications protocol.

Multiple data path ASICs may be combined in parallel to increase bandwidth of data flow by using a bit slice scheme.

BRIEF DESCRIPTION OF THE DRAWINGS

The objects, features and advantages of the method and apparatus of the present invention will be apparent from the following detailed description of the invention in which.

DETAILED DESCRIPTION OF THE INVENTION

An apparatus and method is disclosed for intercoupling components of a computer system using a data path application specific integrated circuit (ASIC). In the following description, for the purposes of explanation, specific devices, signals and data structures are disclosed in order to more thoroughly understand the present invention. However, it will be apparent to one skilled in the art that the present invention may be practiced without the specific details. In other instances, well-known circuits and data structures are not disclosed herein to avoid obscuring the present invention unnecessarily.

Figure 1:
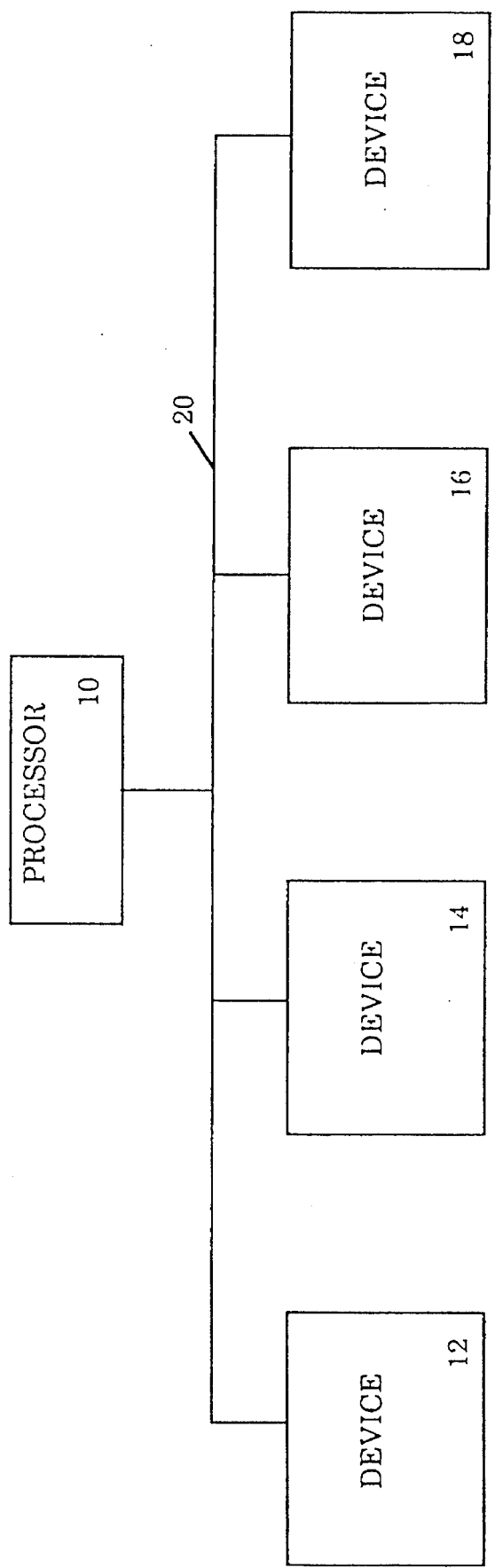
FIG. 1 illustrates a computer system coupled with a bus.
Figure 2:
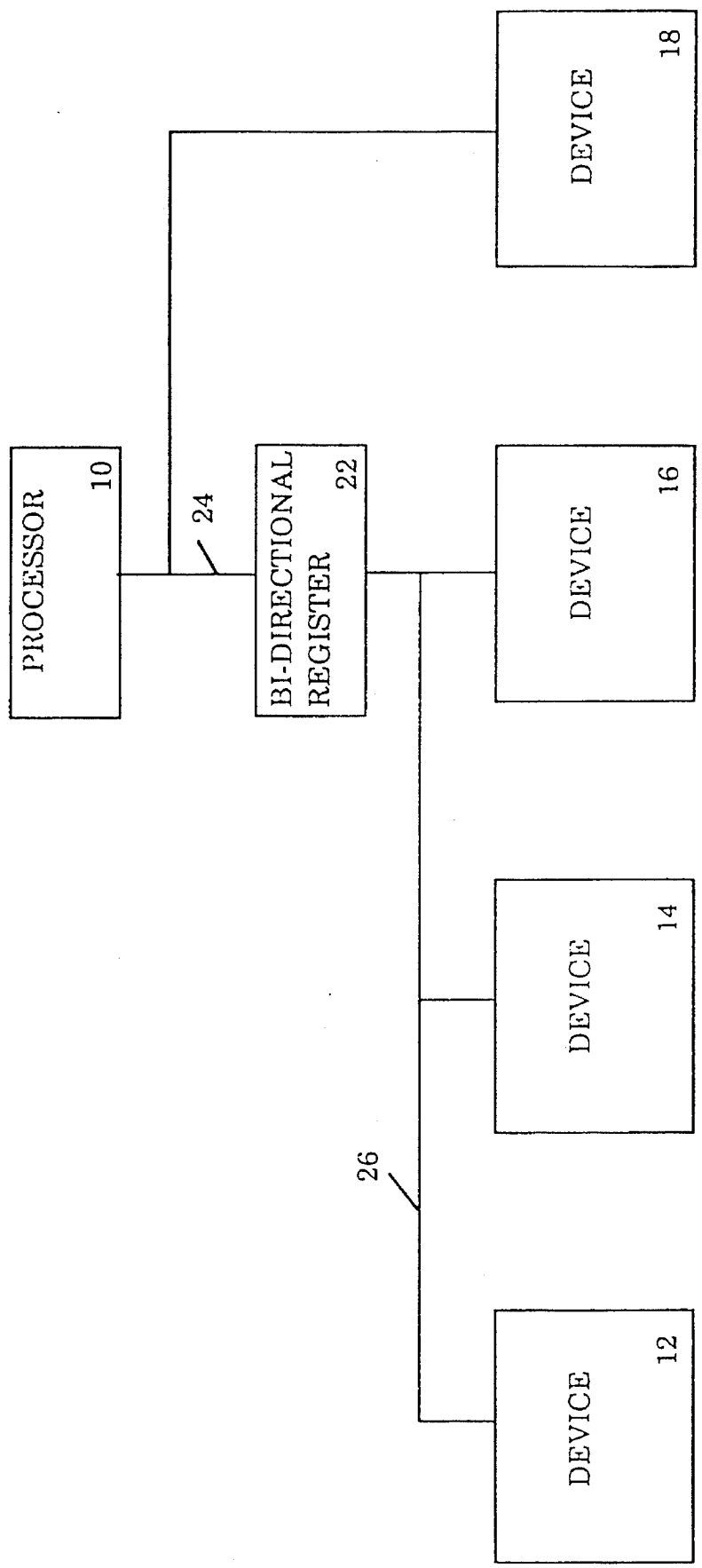
FIG. 2 illustrates a computer system with two buses coupled by a bi-directional register.
Figure 3:
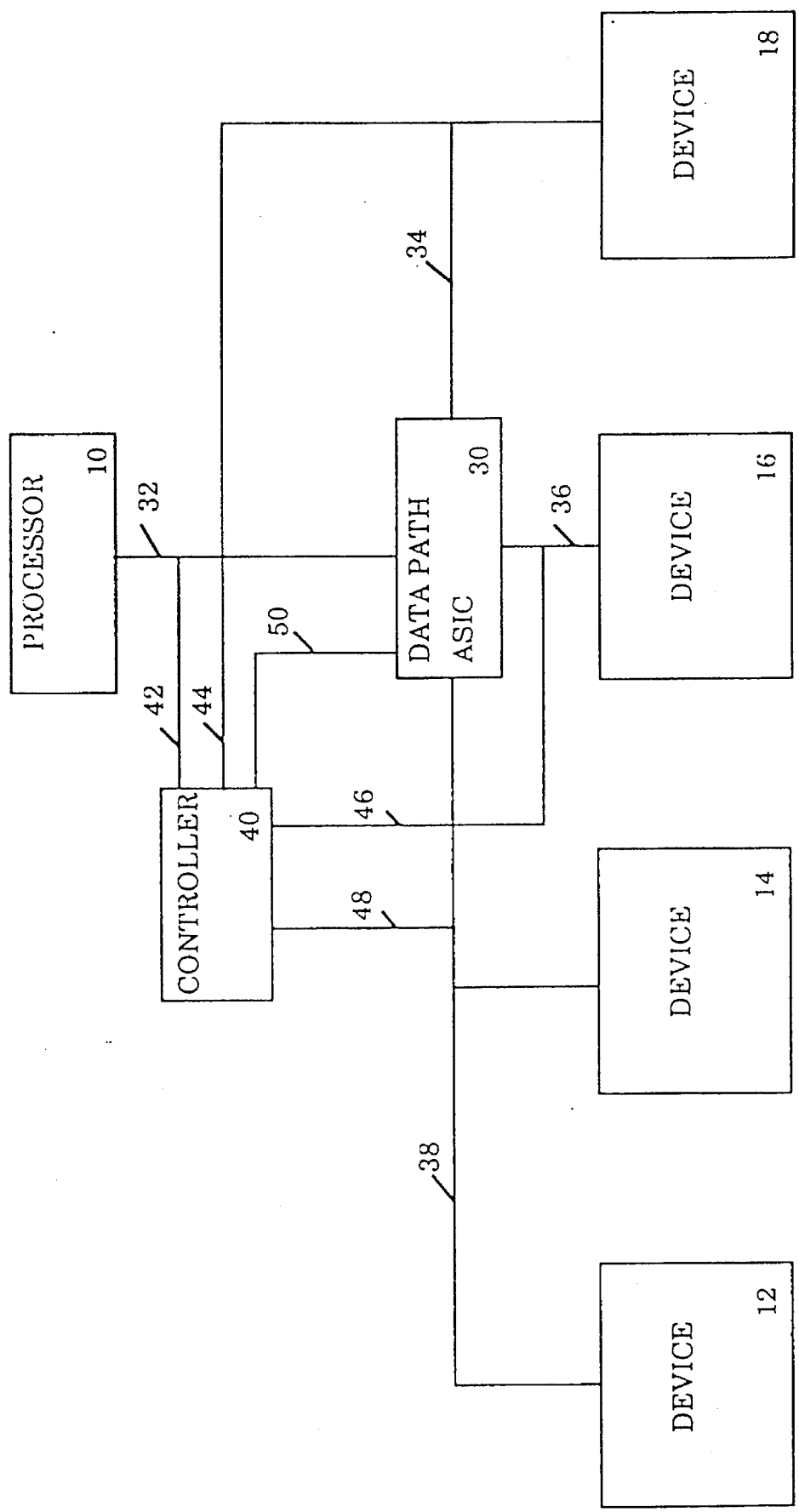
FIG. 3 illustrates a computer system coupled using a data path ASIC crossbar switch of the present invention.

FIG. 3 shows a computer system coupled using a data path application specific integrated circuit (ASIC) crossbar switch. In the figure, processor 10 is coupled to data path ASIC 30 by multi-bit bus 32. Device 18 is coupled to data path ASIC 30 by multi-bit bus 34. Device 16 is also coupled to data path ASIC 30 by bus 36. Furthermore, devices 12 and 14 are coupled to multi-bit bus 38 which is coupled to data path ASIC 30.

Controller 40 is coupled to buses 32, 34, 36 and 38 by control lines 42, 44, 46 and 48 respectively. In this example, it is assumed that buses 32, 34, 36 and 38 carry communications protocol signals in addition to the signals to be transferred by data path ASIC 30. However, it will be obvious to one skilled in the art that, in an alternate embodiment, controller 40 could receive communications protocol signals directly from processor 10 and devices 12, 14, 16 and 18 instead of indirectly through buses 32, 34, 36 and 38. Controller 40 is also coupled to data path ASIC 30 by multi-bit control line 50. Control of the data path ASIC 30 by controller 40 will be discussed in connection with FIG. 4.

While the embodiment of FIG. 3 illustrates a data path ASIC 30 coupled to four buses, it will be obvious to one skilled in the art that, conceptually, any number of buses can be coupled using a single data path ASIC 30. However, the nature of integrated circuits is such that there is a maximum number of pins which may provide signals to, or receive signals from, an integrated circuit. Therefore, the state of the art of integrated circuit packaging, and more specifically, the maximum number of pins attainable for an integrated circuit, places an upper bound on the number of data buses which may be intercoupled using a single data path ASIC 30 for a given bandwidth of the buses.

However, it will be obvious to one skilled in the art that a limit on the number of ports for data path ASIC 30 is not onerous for two reasons. First, "bit slicing", a technique which is well known in the art, can be used when multiple data path ASICs 30 are combined in parallel. Thus, if data path ASIC 30 had a 32 bit bandwidth, and processor 10 and devices 12, 14, 16 and 18 each had 64 bit data paths, two 32 bit data path ASICs 30 could be employed in parallel. One data path ASIC 30 could carry the lower 32 bits of the 64 bit data path and the other data path ASIC 30 could carry the upper 32 bits of the 64 bit data path. Since the signals would have identical origins and destinations, controller 40 could provide control for both data path ASICs 30. In this example, by using two 32 bit data path ASICs 30 in parallel, instead of one 64 bit data path ASIC 30, the number of ports for a given maximum number of pins per integrated circuit can be doubled.

Secondly, data path ASIC 30 is able to accommodate communications at any speed below its maximum value (which is typically the maximum value of the processor 10). Not all components of a computer system operate at the high speed typically presented by the processor 10. Therefore, a conventional data bus may be used to intercouple slower devices to one port of the data path ASIC 30. If devices 12 and 14 operated at a slower speed than processor 10, an example of this technique would be bus 38 which intercouples devices 12 and 14.

Furthermore, the ability of data path ASIC 30 to accommodate communications at any speed below its maximum provides an interleave capability. An example of interleaving would be if processor 10 operated at twice the speed of devices 16 and 18. By alternating accesses between the two devices 16–18, processor 10 would be able to access one of the two devices 16 and 18 on each clock cycle.

Figure 4:
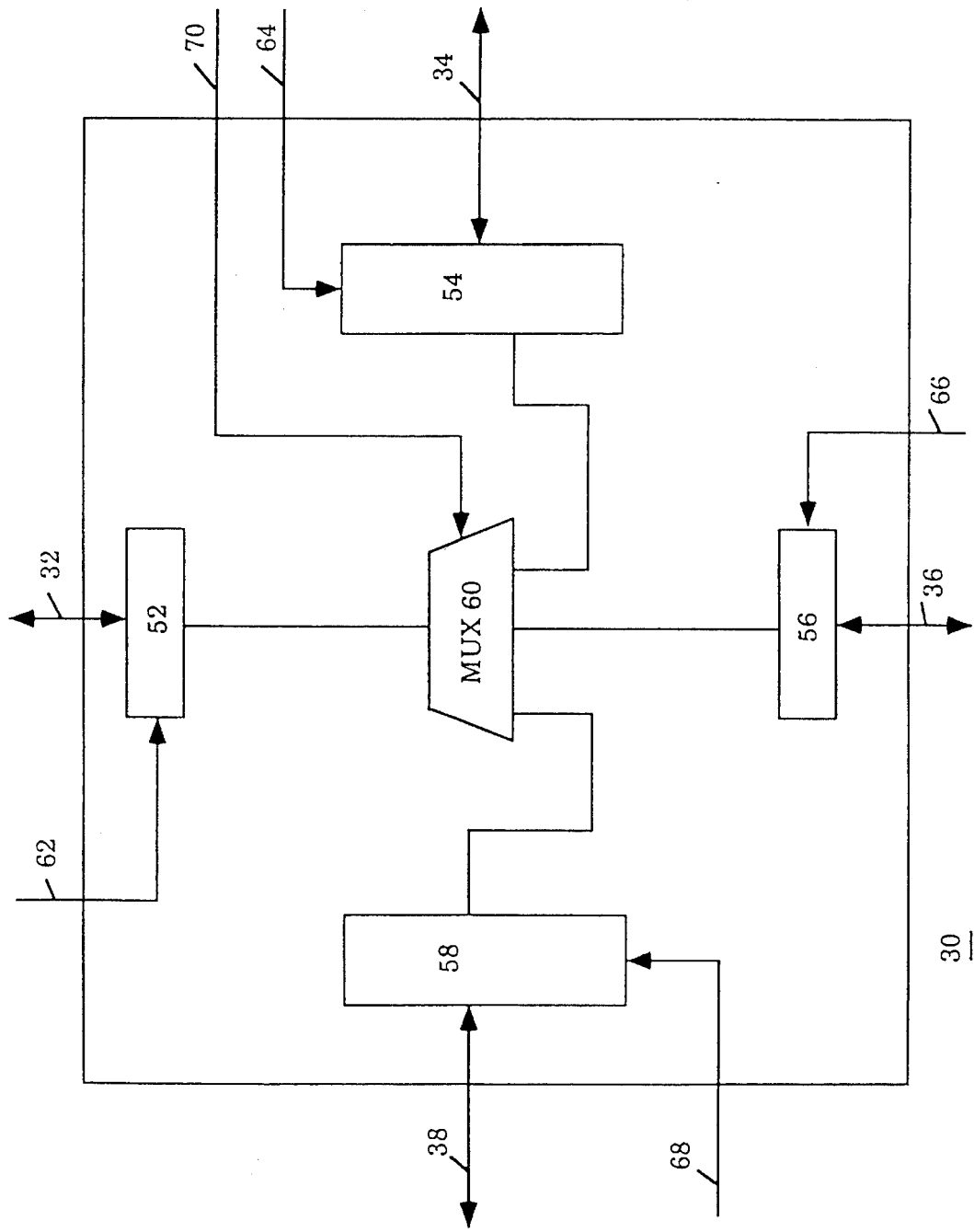
FIG. 4 illustrates circuitry for one embodiment of the data path ASIC of FIG. 3.

Referring now to FIG. 4, the circuitry for the data path ASIC 30 of FIG. 3 is illustrated. Data path ASIC 30 has four ports which correspond to bi-directional registers 52, 54, 56 and 58 which are coupled to buses 32, 34, 36 and 38 respectively. A multi-bit multiplexer 60 is coupled to each of the four bi-directional registers 52, 54, 56 and 58. Multi-bit multiplexer control line 70 is coupled to multiplexer 60 and selectively controls whether multiplexer 60 will permit multi-bit signals to be transmitted from a given port to any other port (or ports).

Bi-directional register control lines 62, 64, 66 and 68 are coupled to corresponding bi-directional registers 52, 54, 56 and 58 and enable the registers to latch multi-bit data presented on buses 32, 34, 36 and 38 respectively or from multiplexer 60. Therefore, for example, an enable signal on bi-directional register control line 62 would cause bi-directional register 52 to latch data presented on bus 32 or latch data from multiplexer 60.

Bi-directional register control lines 62, 64, 66 and 68 and multiplexer control line 70 together form control line 50 of FIG. 3.

Referring back to FIG. 3, control of data path ASIC 30 by controller 40, while dependent upon the particular communications protocol of the processor 10 or devices 12, 14, 16 and 18, is relatively simple and best illustrated by example of representative read and write operations. The examples are representative of generic read and write operations. In an actual implementation, control of the data path ASIC 30 would depend upon the communication protocol of the processor 10 or devices 12, 14, 16 and 18 to be coupled. Actual communications protocols are well known in the art and the example read and write operations have been kept simple for ease of understanding.

In the first example, processor 10 will read data from device 18. The read is initiated by processor 10 signaling controller 40 through control line 42 that it will read device 18. Upon sensing the read request from processor 10, controller 40 will use control line 44 to enable device 18 thereby causing device 18 to drive the requested data onto bus 34.

Referring now to FIG. 4 again, once the requested data is present on bus 34, controller 40 will use bi-directional register control line 64 to signal bi-directional register 54 to latch the requested data. After the requested data has been loaded into register 54, controller 40 will use multiplexer control line 70 to signal multiplexer 60 and thereby set multiplexer 60 so that bi-directional register 54 is coupled to bi-directional register 52. Next the controller will use bi-directional register control line 62 to enable bi-directional register 52 thereby causing bi-directional register 52 to drive the requested data to processor 10 through bus 32. Finally, controller 40 will use control line 42 to signal processor 10 that the processor has the data which it requested. In this way, data can be read at a high rate of speed with a latency penalty of only one clock cycle.

In the second example, referring again to FIG. 3, processor 10 will write data to device 18. The write is initiated by processor 10 signaling controller 40 through control line 42 that it will write to device 18. Upon sensing the write request from processor 10, controller 40 will use control line 42 to enable processor 10 thereby causing processor 10 to drive the data to be written onto bus 32.

Referring now to FIG. 4, once the data to be written is present on bus 32, controller 40 will use bi-directional register control line 62 to signal bi-directional register 52 to latch the data to be written. After the data to be written has been loaded into register 52, controller 40 will use multiplexer control line 70 to signal multiplexer 60 and thereby set multiplexer 60 so that bi-directional register 52 is coupled to bi-directional register 54. Next the controller will use bi-directional register control line 64 to enable bi-directional register 54 thereby causing bi-directional register 54 to drive the data to be written to device 18 through bus 34. Finally, controller 40 would use control line 42 to signal processor 10 that the device has received the data which was to be written. In this way, data can be written with a latency penalty of only one clock cycle.

While the present invention has been particularly described with reference to FIGS. 3–4 and with emphasis on certain computer architecture, it should be understood that the figures are for illustration purpose only and should not be taken as limitations upon the present invention. In addition, it is clear that the method and apparatus of the present invention has utility in any application where high speed transfer of data is desired. It is contemplated that numerous alternatives, modifications, variations and uses may be made, by one skilled in the art, without departing from the spirit and scope of the invention as disclosed above.

What is claimed is:

1. A system comprising:

at least three computer components, each of the components having a capacitive load;

a data path integrated circuit, coupled to the components, the data path integrated circuit electrically isolating each of the components such that the capacitive loads of the components cannot combine, the data path integrated circuit capable of permitting data signals to be selectively transferred through the data path integrated circuit between first and second components of the components and between the first and a third component of the components; and a controller coupled to the components and to the data path integrated circuit, the controller capable of selectively controlling transfer of the data signals through the data path integrated circuit between the first and second components and between the first and third components wherein the data path integrated circuit is comprised of:

a plurality of buffers capable of receiving and holding the data signals from a corresponding computer component of the components, there being one buffer for each of the components, each buffer coupled to the corresponding computer component and to the controller, each buffer holding and releasing the data signals at the behest of the controller; and a switch coupled to each of the buffers and to the controller, each buffer interposed between the corresponding computer component and the switch, the switch selectively diverting the flow of the data signals from any buffer to any other buffer at the behest of the controller.

2. The system as set forth in claim 1 wherein at least one of the buffers is bi-directional.

3. The system as set forth in claim 1 wherein the switch is a multiplexer.

4. The system as set forth in claim 1 wherein the transfer of data signals between the first and second components occurs alternately with transfer of the data signals between the first and third components.

5. The system as set forth in claim 1 wherein the data signals comprise a plurality of data signal subsets and the controller controls a plurality of data path integrated circuits, each of the data path integrated circuits corresponding to one of the data signal subsets.

6. The system as set forth in claim 1 wherein at least one of the components comprises a first sub-component and a second sub-component coupled to the first sub-component.

7. The system as set forth in claim 1 wherein the first component notifies the controller when it is to receive the data signals from the second component;

the controller, in response, instructs the data path integrated circuit to receive the data signals from the second component, and instructs the second component to send the data signals to the data path integrated circuit;

the second component, in response, sends the data signals to the data path integrated circuit;

the controller, in response, instructs the data path integrated circuit to divert the data signals to the first component, and instructs the first component to receive the signals from the data path integrated circuit; and the first component, in response, receives the data signals from the data path integrated circuit.

8. The system as set forth in claim 1 wherein the first component notifies the controller when it is to send the data signals to the second component;

the controller, in response, instructs the data path integrated circuit to receive the data signals from the first component;

the first component, in response, sends the data signals to the data path integrated circuit;

the controller, in response, instructs the data path integrated circuit to divert the data signals to the second component, and instructs the second component to receive the data signals from the data path integrated circuit; and the second component, in response, receives the data signals from the data path integrated circuit.

9. A system comprising:

at least three computer components, each of the components having a capacitive load;

a controller coupled to the components;

a data path integrated circuit coupled to the components and electrically isolating each of the components such that the capacitive loads of the components cannot combine, the data path integrated circuit comprising:

at least three buffers, each buffer having a first interface coupled to a corresponding component of the components, a second interface, and a control input coupled to the controller, each buffer receiving and holding data signals from the corresponding component in response to a first state of the control input, each buffer releasing data signals to the corresponding component in response to a second state of the control input; and a switch coupled to the second interface of each of the buffers and to the controller, the switch selectively diverting the flow of data signals from any buffer to any other buffer at the behest of the controller.

* * * * *